United States Patent [19]
Lorenzen et al.

[11] Patent Number: 4,889,140
[45] Date of Patent: Dec. 26, 1989

[54] APPARATUS FOR MAKING PERFORATIONS IN ARTICLES OF THE TOBACCO PROCESSING INDUSTRY

[75] Inventors: Heinz C. Lorenzen, Wentorf; Peter Pinck, Gross-Hansdorf; Norbert Lange, Glinde, all of Fed. Rep. of Germany

[73] Assignee: Körber AG, Hamburg, Fed. Rep. of Germany

[21] Appl. No.: 510,400

[22] Filed: Jul. 1, 1983

[30] Foreign Application Priority Data

Jul. 6, 1982 [DE] Fed. Rep. of Germany ....... 3225183

[51] Int. Cl.⁴ .............................................. A24B 7/14
[52] U.S. Cl. .................................................. 131/281
[58] Field of Search ......................................... 131/281

[56] References Cited
U.S. PATENT DOCUMENTS 4,121,595 10/1978 Heitmann et al. ................... 131/281
4,281,670 8/1981 Heitmann et al. .................... 131/28

FOREIGN PATENT DOCUMENTS 2528467 12/1976 Fed. Rep. of Germany ...... 131/281

Primary Examiner—V. Millin
Attorney, Agent, or Firm—Peter K. Kontler

[57] ABSTRACT

Apparatus for making perforations in a running web of wrapping material for tobacco or filter rods or in the wrappers of discrete cigarettes has a carbon dioxide laser with two parallel resonators which are mechanically coupled to each other to define a U-shaped resonance chamber and the free ends of which carry partially transmitting mirrors for the passage of discrete active beams of coherent radiation. The two active beams are thereupon split into pairs of split beams and the split beams are focused upon the running web of wrapping material or upon the wrappers of successive rod-shaped articles to simultaneously form four rows of perforations.

16 Claims, 1 Drawing Sheet

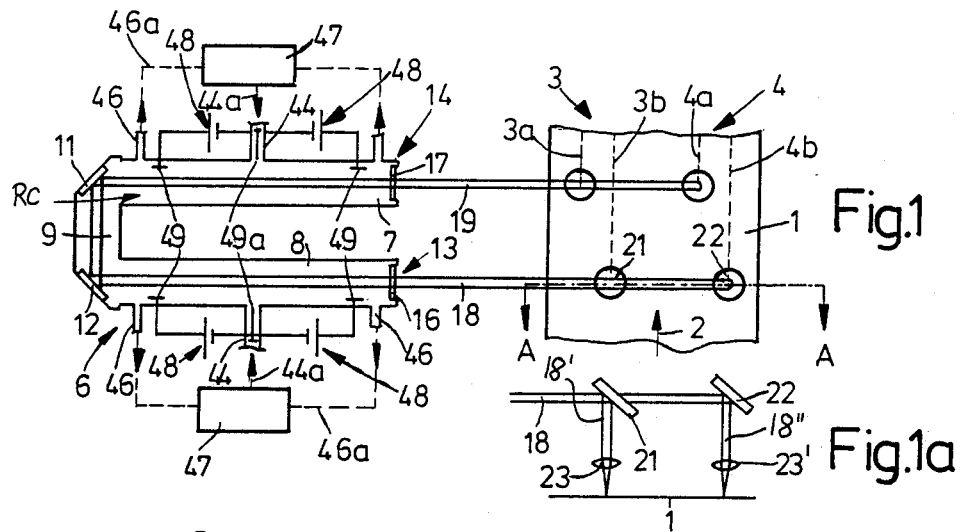
Fig.1
Fig.1a
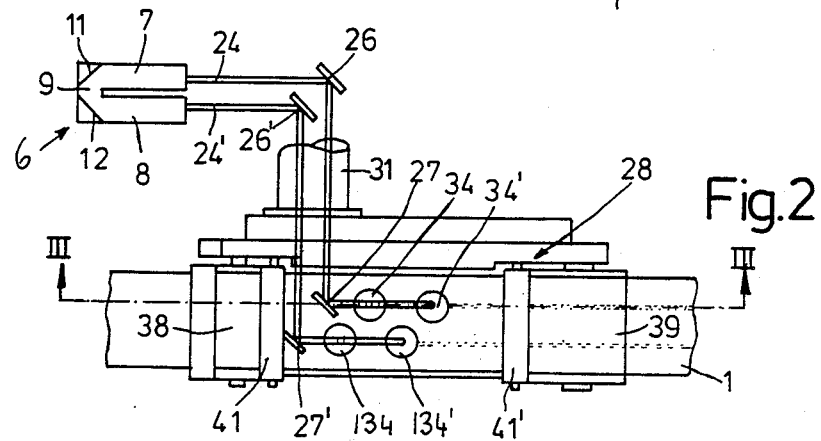
Fig.2
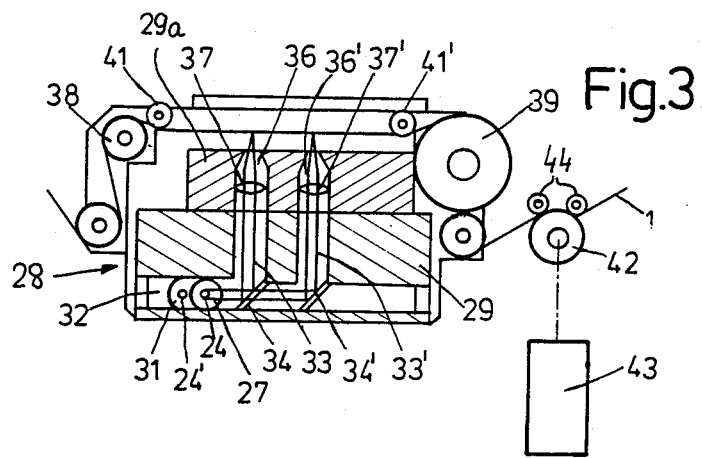
Fig.3

APPARATUS FOR MAKING PERFORATIONS IN ARTICLES OF THE TOBACCO PROCESSING INDUSTRY

BACKGROUND OF THE INVENTION

The present invention relates to apparatus for making holes in webs of paper or the like, and more particularly to improvements in apparatus for perforating webs of cigarette paper, tipping paper or other wrapping or confining materials which are utilized in the tobacco processing industry. Still more particularly, the invention relates to improvements in apparatus for making perforations in running webs of wrapping material or in the wrappers of discrete articles which constitute or form part of smokers' products and wherein the perforations are made by resorting to beams of coherent radiation.

It is already known to employ lasers or analogous sources of coherent radiation for the making of perforations in webs of cigarette paper, tipping paper or the like. It is also known to resort to lasers in connection with the making of holes directly in the wrappers of plain or filter cigarettes, filter rod sections and analogous rod-shaped articles which constitute or form part of smokers' products. Such apparatus normally further comprise means for transporting the material to be perforated into the range of coherent radiation as well as means for directing the radiation which issues from the source upon selected portions of the article or articles to be perforated. Lasers or analogous sources of coherent radiation can be used in connection with the making of holes in a wide variety of smokers' products, either prior to completion of such products (e.g., in the wrapping material which is to be applied to fillers and consists of webs of cigarette paper or tipping paper, sections of tipping paper or the like) or directly in the tubular wrappers of finished products (such as plain or filter tipped cigarettes, filter rod sections, plain or filter tipped cigarillos and others).

One of the primary reasons for perforating wrapping material, such as webs or sections of cigarette paper, tipping paper and the like, is that this provides the wrappers of finished products with zones of desired permeability which render it possible to control the nicotine and/or condensate contents of tobacco smoke. Apparatus for making such types of perforations are disclosed, for example, in U.S. Pat. No. 4,121,595 granted Oct. 24, 1978 to Uwe Heitmann et al., and in U.S. Pat. No. 4,281,670 granted Aug. 4, 1981 to Uwe Heitmann et al. An advantage of coherent radiation is that it can be used to provide a web of paper or the like with one or more zones of highly predictable permeability and also that the permeability is constant in each portion of such zone or zones, i.e., while the perforating apparatus is in uninterrupted use during an entire shift or much longer.

A modern filter tipping machine e.g., a machine known as MAX S which is produced and distributed by the assignee of the present application) normally produces pairs of filter cigarettes of unit length. As a rule, a continuous cigarette rod which is produced in a rod making machine (such as the machine known as PROTOS which is manufactured and sold by the assignee of the present application) is subdivided into a file of plain cigarettes of double unit length, and the direction of movement of successive plain cigarettes of double unit length is changed from axial to transverse so that the cigarettes form a row of parallel articles each of which is thereupon severed to yield two coaxial plain cigarettes of unit length. The cigarettes of each pair are moved axially of and away from each other to provide room for filter rod sections of double unit length. The thus obtained groups, each of which contains two plain cigarettes of unit length and a filter rod section of double unit length therebetween, are thereupon converted into filter cigarettes of double unit length by draping a uniting band of tipping paper around the filter rod section and around the adjacent inner end portions of the plain cigarettes of unit length. Each filter cigarette of double unit length is severed midway between its ends to yield two filter cigarettes of unit length.

In order to provide each cigarette of unit length with a so-called ventilation zone which admits atmospheric air into the column of tobacco smoke, it is customary to provide a web of tipping paper with one or more perforated zones prior to subdivision of the web into discrete uniting bands, or to make holes in the wrappers of finished filter cigarettes of unit length or double unit length. As a rule, each perforated zone consists of two or more rows of aligned perforations. To this end, and assuming that the perforations are made by beams of coherent radiation, the single beam which issues from a conventional laser is split once or more than once so as to provide a requisite number of split beams or partial beams, one for each row of perforations. A suitable mode of splitting a laser beam for such purposes is disclosed in the commonly owned U.S. patent application Ser. No. 294,815 filed Aug. 20, 1981 by Peter Pinck et al. The apparatus of Pinck et al. is quite satisfactory but rather expensive because repeated splitting of the laser beam necessitates a considerable outlay for the manufacture and adjustment of the optical systems which split the beam and focus the thus obtained split beams. Highly accurate splitting of the beam is not only desirable but in fact necessary because the permeability of the wrapper of each and every product (e.g., filter cigarette of unit length) of a long line of products should be maintained within an extremely narrow range.

OBJECTS AND SUMMARY OF THE INVENTION

An object of the invention is to provide an apparatus which is constructed and assembled in such a way that coherent radiation issuing from a laser or an analogous source of coherent radiation can be split in a simple and inexpensive way but with a very high degree of accuracy to thus ensure the making of predictable perforations in two or more selected zones of finished or unifinished wrappers of cigarettes or the like.

Another object of the invention is to provide a novel and improved source of coherent radiation for use in an apparatus of the above outlined character.

A further object of the invention is to provide an apparatus which can be designed to make perforations in a continuous web of wrapping material or in the wrappers of discrete smokers' products.

An additional object of the invention is to provide a novel and improved method of subdividing the beam of coherent radiation which issues from a laser or an analogous source.

Still another object of the invention is to provide an apparatus which can be installed in or combined with existing machines for the making and/or processing of wrapping materials for the constituents of or for entire rod-shaped smokers' products.

A further object of the invention is to provide a novel and improved method of manipulating coherent radiation between the locus where the radiation issues from a source and the locus or loci where the radiation impinges upon a sheet- or strip-like material for use in the manufacture of cigarettes or the like.

An additional object of the invention is to provide an apparatus which can be used with particular advantage in connection with the production of filter cigarettes or the like.

Another object of the invention is to provide a novel optical system which can be utilized in combination with and/or in an apparatus of the above outlined character for the splitting and/or focusing of one or more laser beams.

The invention is embodied in an apparatus for making perforations in articles of the tobacco processing industry. The apparatus comprises means for transporting the articles to be perforated along a predetermined path, and a source of coherent radiation including a laser comprising a plurality (e.g., a pair) of at least substantially parallel resonators each having a first and a second end portion, one or more bridges or other suitable means for mechanically coupling the first end portions of the resonators to one another so that the resonators together define at least one substantially U-shaped resonance chamber whose web is defined by a mechanical coupling means and whose flanges or legs are defined by the respective resonators, optical coupling means (e.g., totally reflecting mirrors) provided in the resonance chamber at the first end portions of the resonators, and partially transmitting optical means (e.g., half transmitting mirrors) provided at the second end portions of the resonators to permit a discrete active beam of coherent radiation to issue from the respective resonator. The apparatus further comprises means for focusing the active beams upon selected portions of articles in the path, and the apparatus preferably further comprises optical elements which are installed in each of the active beams between the second end portions of the respective resonators and the focusing means. Such optical elements can comprise a beam splitter for each active beam and/or a totally reflecting mirror for each active beam. For example, the optical elements can comprise means for splitting each active beam into a plurality of split beams and the focusing means can comprise a discrete focusing device for each split beam so that each active beam can provide the selected portion of each article with several sets of perforations, one for each of the respective split beams. Each set of perforations can constitute a row extending in the direction of transport of articles along their path. The number of active beams can equal two.

The articles to be perforated can constitute a continuous web of coherent articles (e.g., a web of tipping paper consisting of coherent uniting bands for use in a filter tipping machine), and the transporting means then perferably comprises means for moving the web lengthwise.

Alternatively, the articles can constitute rods (e.g., filter rod sections of multiple unit length or filter cigarettes of unit length or multiple unit length) each having a tubular wrapper which is perforated by the active beams, and the transporting means then preferably comprises means (e.g., a fluted drum) for conveying the rods sideways, i.e., in a direction at right angles to their respective axes.

The laser can constitute a gas laser, preferably a carbon dioxide laser, and each resonator can comprise an elongated tube having an intermediate portion disposed between the respective first and second end portions. Such laser can further comprise at least one source of gas, means for admitting the gas from such source into the intermediate portions of the tubes and means for evacuating the gas from the first and second end portions of each tube. Such laser can further comprise first and second electrodes disposed in the respective end portions of each tube and a third electrode disposed between the respective first and second electrodes. Discrete energy sources are connected between the first and second electrodes of each tube on the one hand and the respective third electrode on the other hand so that each tube defines two discharge paths, namely, one between the first and third and the other between the second and third electrodes. The first and second electrodes in at least one of the tubes can constitute ring electrodes. The length of each tube can be the same.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic plan view of an apparatus which embodies one form of the invention and is designed to make four rows of perforations in a running web of tipping paper;

FIG. 1a is a fragmentary sectional view as seen in the direction of arrows from the line A—A of FIG. 1;

FIG. 2 is a schematic plan view of a modified apparatus which is also designed to make rows of perforations in a running web of wrapping material; and FIG. 3 is a sectional view as seen in the direction of arrows from the line III—III of FIG. 2.

DESCRIPTION OF THE PREFERRED EMBODIMENTS

Referring first to FIG. 1, there is shown a web 1 of wrapping material, such as tipping paper, which is to be provided with two longitudinally extending zones 3 and 4 of perforations 3a, 3b and 4a, 4b. The perforations 3a to 4b form four parallel rows which extend lengthwise of the running web 1. The direction of transport of the web 1 is indicated by the arrow 2. The manner in which the web 1 is transported lengthwise is disclosed, for example, in the aforementioned commonly owned U.S. Pat. No. 4,281,670 wherein FIG. 1 illustrates a filter tipping machine of the type known as MAX S. This web can be said to constitute a series of coherent uniting bands (articles of the tobacco processing industry).

The source of coherent radiation in the apparatus of FIG. 1 is a bent carbon dioxide laser 6 which, in accordance with a feature of the invention, comprises two parallel resonators 7 and 8. The lefthand (first) end portions of the resonators 7 and 8, as viewed in FIG. 1, are mechanically connected to each other by a coupling means in the form of a bridge 9 which cooperates with the resonators to define therewith a substantially U-shaped resonance chamber RC. Optical coupling of the resonators 7, 8 to one another is effected by radiation deflecting mirrors 11 and 12. The free (second end portions 14 and 13 of the resonators 7 and 8, namely, the end portions which are remote from the bridge 9, are provided with partially transmitting mirrors 17 and 16 so that the laser 6 furnishes two active beams 18 and 19. The intensity of the active beams 18 and 19 may but need not be the same; this depends upon the transmissivity of the mirrors 16 and 17. Thus, the energy of the beam 19 will be more pronounced than that of the beam 18 if the transmissivity of the mirror 17 exceeds that of the mirror 16.

Each of the resonators 7, 8 resembles a gas discharge tube which is provided with a centrally located gas admitting nipple and two gas evacuating nipples at the respective ends. The central gas admitting nipples are denoted by the reference characters 44, and the gas evacuating nipples at the ends are denoted by the characters 46. The source of carbon dioxide gas is shown at 47, and this source admits gas to the central nipples 44 via conduits 44a. Gas which issues from the nipples 46 at the ends of the resonators 7 and 8 is returned to the source 47 via conduits 46a. Alternatively, the nipples 46 can discharge carbon dioxide gas into the atmosphere.

The centrally located nipple 44 of each of the two resonators 7, 8 contains a high-voltage electrode 49a, and additional high-voltage electrodes 49 are disposed in and close to the two ends of each of the two resonators. Each of the electrodes 49 can constitute a ring electrode. Sources 48 of high-voltage are connected between each of the centrally located electrodes 49a and the respective pairs of ring electrodes 49 to furnish pulsed high-voltage impulses so that the laser furnishes active beams 18, 19 in pulsating fashion at the desired frequency of making perforations 3a-4b in the web 1.

The active beams 18 and 19 which issue from the laser 6 via mirrors 16 and 17 are polarized so that it is possible to effect a highly accurate splitting of such beams by resorting to optical means. FIG. 1a shows, by way of example, the means for splitting the active beam 18. Such beam splitting means comprises a partially transmitting mirror 21 which directs a portion 18' of the beam 18 toward the zone 3 of the running web 1. The non-deflected portion 18" of the beam 18 is totally deflected by a mirror 22 which directs the beam portion 18" against the zone 4 of the web 1. The deflected or split portions or beams 18' and 18" are respectively focused by optical elements 23 and 23' so that they burn holes in the respective zones 3 and 4 of the web 1. If the mirror 21 transmits exactly one-half of the active beam 18, the intensity of split beams 18' and 18" is the same, i.e., the dimensions of the perforations 3b are identical with those of the perforations 4b. The means for splitting the active beam 19 and for focusing the resulting split beams upon the web 1 to form the perforations 3a and 4a are preferably identical with the just described components 21, 22 and 23, 23'. The mirrors 21 and 22 for the active beam 18 are offset with reference to the corresponding mirrors for the active beam 19 so that the web 1 is formed with four discrete parallel rows of perforations 3a, 4a (caused by the beam 19) and 3b, 4b (caused by the beam 18).

The mode of operating the laser 6 is essentially identical with that of operating a laser having a single resonator. Reference may be had to the aforementioned U.S. Pat. Nos. 4,121,595 and 4,281,670 to Heitmann et al.

FIG. 2 illustrates a second embodiment of the improved apparatus. The apparatus comprises a laser 6 which is identical with or analogous to the laser of FIG. 1. The active beams 24 and 24' which issue from the free ends of the resonators 7 and 8 are deflected by fully reflecting mirrors 26 and 26' and thereupon by the fully reflecting mirrors 27, 27' so that they propagate themselves in parallelism with the longitudinal direction of the running web 1. The mirrors 27, 27' direct the respective beams 24, 24' into the interior of a perforating unit 28. Though the top portion of the unit 28 is not transparent, FIG. 3 illustrates certain component parts in the interior of this unit as well as the paths of the beams 24, 24' for the sake of better understanding of the invention. The same holds true for the web 1 which need not be transparent or translucent and which advances along a path extending at a level above the perforating unit 28.

The perforating unit 28 comprises a lower portion or base 29 and the aforementioned top portion 29a. The lower portion 29 has a channel 31 which admits the twice deflected beams 24, 24' into the interior of the perforating unit 28 and is intersected by two channels of which only one (namely, the channel 32) can be seen in FIG. 3. The totally reflecting mirror 27 is disposed at the intersection of the channels 31, 32 and directs the beam 24 into the channel 32 which contains a partially transmitting mirror 34 and a fully or totally reflecting mirror 34'. The mirror 34 deflects a portion 33 of the beam 24 into a channel or bore 36, and the mirror 34' deflects the remainder 33' of the beam 24 into a channel or bore 36'. The mirror 34 transmits one-half and reflects the other half of the beam 24. The upper portions of the bores 36 and 36' are provided in the upper portion 29a of the perforating unit 28 and register with the lower portions of such bores which are machined into the lower portion 29. The top portion 29a is secured to the lower portion 29 in a manner not forming part of the present invention. The upper portions of the bores 36 and 36' respectively contain optical elements 37 and 37' which focus the corresponding beams 33 and 33' upon the web 1. The manner in which the beam 24' is split and focused in the perforating unit 28 is the same as described above for the beam 24. FIG. 2 merely shows the mirrors 134 and 134' which respectively correspond to the aforediscussed mirrors 34 and 34'.

The web 1 which is shown in FIGS. 2 and 3 is guided by rotary elements 38 and 39. Additional rotary elements or rollers 41 and 41' serve to tension the web 1 between the rotary elements 38 and 39 to ensure that the web portion above the top portion 29a of the perforating unit 28 is located in a predetermined path at an optimum distance from the focusing elements in the bores of the top portion 29a. The web 1 is advanced lengthwise by a transporting roller 42 which cooperates with two smaller rollers 44 and is driven by a suitable motor 43. A perforating unit which is analogous to the perforating unit 28 of FIGS. 2 and 3 is disclosed in the aforementioned commonly owned U.S. patent application Ser. No. 294,815 of Pinck et al. All of the patents, other publications and pending patent applications which are mentioned herein are incorporated by reference.

The apparatus of FIGS. 1–1a and FIGS. 2–3 were described in connection with the making of perforations in a running web of tipping paper or the like. Such apparatus can be integrated into filter tipping machines, e.g., MAX S machines, wherein they serve to perforate a continuous web of tipping paper prior to subdivision of tipping paper into discrete uniting bands each of which is used to connect two plain cigarettes of unit length with a filter rod section of double unit length. Of course, it is equally possible to construct the improved apparatus as a separate unit which is designed to perforate a web of tipping paper or the like prior to winding or renewed winding of tipping paper onto a reel preparatory to transport of the reel into storage or to a filter tipping, cigarette rod making, filter rod making or like machine. Still further, the apparatus of the present invention can be used with equal or similar advantage for the making of perforations in the wrappers of finished rod-shaped articles, e.g., in the wrappers of filter cigarettes of double unit length prior to subdivision of each such cigarette into two filter cigarettes of unit length. To this end, the apparatus can be installed in a filter tipping machine to make perforations in rod-shaped articles in a manner as fully described and shown in the aforementioned U.S. Pat. No. 4,281,670 to Heitmann et al. The means for transporting rod-shaped articles into the range of split beams of coherent radiation can constitute a rotary drum which transports a row of articles sideways, i.e., at right angles to their respective axes.

An important advantage of the improved apparatus is that it can employ a high-energy laser and that the energy which is furnished by the laser is available in the form of two discrete beams at the locations where it issues from the laser. Moreover, and since the radiation issuing from the coupled-together resonators 7, 8 is polarized, this allows for highly accurate splitting of each beam which evidently constitutes a further important advantage of the improved apparatus. Still further, and since the resonators are mounted in parallel to each other, the improved laser occupies little room in spite of its pronounced energy output.

Another important advantage of the improved apparatus is that only one beam splitting optical element (such as 21 in FIG. 1a and 34 in FIG. 3) is needed for each active beam of coherent radiation. This greatly reduces the cost of the optical system. As a rule, the perforations 3a are identical with the perforations 3b, 4a and 4b. This ensures, in a very simple way, that the permeability of that zone of the web 1 which is formed with the two rows of perforations 3a, 3b is identical to the permeability of the other zone of the same web which is formed with the perforations 4a and 4b. Such identity of perforations can be readily achieved by the simple expedient of employing two half transmitting mirrors 16, 17 and two half transmitting beam splitters for the active beams 18 and 19 or 24, 24'. Of course, it is equally possible to split each of the active beams 18, 19 or 24, 24' into three or more identical split beams and to use one-half of the total number of split beams for the making of perforations in the zone 3 and the other half of the total number of split beams for the making of perforations in the zone 4 of the running web 1 or in the wrappers of successive cigarettes of double unit length or the like.

A gas laser, particularly a carbon dioxide laser, is preferred at this time because the energy output of such laser is best suited for the purposes of making perforations in articles of the tobacco processing industry. The energy output of the improved laser can be in the range of between about 50 and about 400 W. However, it is also possible to employ a laser whose output is less than 50 or in excess of 400 W.

The manner in which the energy supplied by the sources 48 is pulsed at the desired frequency (of making perforations in the web 1) is known and need not be described here. The feature that each tubular resonator 7, 8 of the improved laser 6 provides two discharge paths is desirable and advantageous because this ensures that the laser is reliably fired in response to the application of each and every high-frequency energy pulse.

It is already known to employ so-called bent or folded carbon dioxide lasers. Reference may be had, for example, to German Offenlegungsschrift No. 25 28 467 published Dec. 30, 1976. However, such conventional folded lasers are capable of emitting a single active beam of coherent radiation, and the single active beam is not split prior to impingement upon a workpiece. Thus, this reference does not deal with and does not solve the problem of accurate splitting of one or more active beams of coherent radiation.

German Auslegeschrift No. 15 64 779 published Feb. 27, 1975 discloses a giant-impulse laser with a rod-like excitable medium (ruby) which is designed to emit two active beams in order to reduce the danger of material collapse in spite of intensity of the output of the laser. The two active beams are thereupon caused to merge into a single beam of coherent radiation. Thus, this publication also fails to recognize and/or solve the problem of splitting two or more active beams.

On the other hand, the apparatus of the present invention renders it possible to effect a predictable and optimum splitting of one or more beams of coherent radiation so that each and every active beam can be used for the making of several rows of perforations of desirable (optimum) size and at a desired frequency. This is attributable, to a considerable extent, to the fact that the improved laser emits polarized beams of coherent radiation because such polarized beams can be more readily split in a simple, inexpensive and highly predictable way. Moreover, the generation of two active beams by resorting to the improved (folded) laser 6 also facilitates the splitting of the beams because the energy of each of the two active beams is only half the total energy output of the laser. This reduces the stresses upon and the cost of the optical components of the apparatus, namely, of the components which transmit, deflect and reflect the active beams and split beams. As already mentioned above, the utilization of a folded laser contributes to compactness of the laser and of the entire apparatus. Such compactness is attributable to a considerable extent to the feature that the resonators of the laser 6 are at least substantially parallel to one another. By connecting two or more lasers in series, one can increase the number of rows of perforations without substantial additional expenses for optical equipment. For example, if the apparatus comprises two lasers, it is capable of providing two discrete regions or zones of the web 1 with four rows of perforations each.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for making perforations in articles of the tobacco processing industry, comprising means for transporting the articles along a predetermined path; a source of coherent radiation including a laser comprising a plurality of at least substantially parallel hollow resonators each having first and second end portions, means for mechanically coupling the first end portions of said resonators to each other so that the resonators together define a substantially U-shaped resonance chamber, a source of gas, means for admitting the gas from said source into said resonators, means for evacuating the gas from said resonators, at least one energy source, electrodes connected to said energy source and installed in said resonators, optical coupling means provided in said chamber at the first end portions of said resonators, and partially transmitting optical means provided at the second end portions of said resonators to permit a discrete active beam of coherent radiation to issue from the respective resonator; and means for focusing the active beams upon selected portions of articles in said path.

2. The apparatus of claim 1, wherein said laser comprises two resonators.

3. The apparatus of claim 1, further comprising optical elements installed in each of said active beams between the second end portions of the respective resonators and said focusing means.

4. The apparatus of claim 3, wherein said optical elements comprise a beam splitter for each of said active beams.

5. The apparatus of claim 4, wherein said optical elements comprise a totally reflecting mirror for each of said active beams.

6. The apparatus of claim 3, wherein said optical elements include means for splitting each active beam into a plurality of split beams and said focusing means comprises a discrete focusing device for each split beam so that each active beam can provide the selected portion of each article with several sets of perforations, one for each of the respective split beams.

7. The apparatus of claim 6, wherein each set of perforations constitutes a row extending in the direction of transport of articles along said path and the number of said active beams equals two.

8. The apparatus of claim 1, wherein the articles to be perforated together constitute a continuous web of coherent articles and said transporting means comprises means for moving the web lengthwise.

9. The apparatus of claim 1, wherein the articles are rods each having a tubular wrapper which is perforated by said beams, said transporting means comprising means for conveying the rods in a direction at right angles to their respective axes.

10. The apparatus of claim 1, wherein said laser is a gas laser.

11. The apparatus of claim 10, wherein said laser is a carbon dioxide laser.

12. The apparatus of claim 1, wherein each of said resonators includes an elongated tube having an intermediate portion disposed between the respective first and second end portions, said gas admitting means being arranged to admit the gas from the source of gas into the intermediate portions of said tubes and said evacuating means being arranged to evacuate the gas from the end portions of said tubes.

13. The apparatus of claim 1, wherein said electrodes include first and second electrodes disposed in the respective end portions of each resonator and a third electrode disposed between the respective first and second electrodes, said energy source including discrete energy sources connected between the first and second electrodes of each resonator on the one hand and the respective third electrode on the other hand so that each of said resonators defines two discrete paths, one between the first and third and the other between the second and third electrodes.

14. The apparatus of claim 13, wherein said first and second electrodes in at least one of said resonators are ring electrodes.

15. The apparatus of claim 1, wherein each of said partially transmitting means includes a half transmitting mirror so that the intensities of each of said active beams are the same.

16. The apparatus of claim 1, wherein said resonators are elongated tubes having identical lengths.

* * * * *